(12) United States Patent
Zafarana et al.

(10) Patent No.: US 12,368,366 B2
(45) Date of Patent: Jul. 22, 2025

(54) METHODS AND SYSTEMS OF CURRENT SENSING IN SWITCHING POWER CONVERTERS

(71) Applicant: SEMICONDUCTOR COMPONENTS INDUSTRIES, LLC, Phoenix, AZ (US)

(72) Inventors: Alessandro Zafarana, Milan (IT); Salvatore Leone, Milan (IT)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 345 days.

(21) Appl. No.: 18/068,579

(22) Filed: Dec. 20, 2022

(65) Prior Publication Data
US 2024/0204643 A1     Jun. 20, 2024

(51) Int. Cl.
*H02M 3/158*     (2006.01)
*H02M 1/00*      (2006.01)

(52) U.S. Cl.
CPC ......... *H02M 1/0009* (2021.05); *H02M 3/158* (2013.01)

(58) Field of Classification Search
CPC .... H02M 1/0009; H02M 3/158; H02M 3/156; H02M 3/1588
See application file for complete search history.

(56) References Cited

U.S. PATENT DOCUMENTS

| | | | | |
|---|---|---|---|---|
| 10,063,143 B1* | 8/2018 | Fan | ...................... | H02M 5/458 |
| 10,063,146 B1* | 8/2018 | Lee | ...................... | G01R 19/003 |
| 11,552,571 B1* | 1/2023 | Sozzani | ................ | H02M 3/156 |
| 11,799,473 B1* | 10/2023 | Hsu | .......................... | H03K 5/24 |
| 12,176,808 B2* | 12/2024 | D'Souza | ................ | H02M 3/07 |
| 2006/0017421 A1* | 1/2006 | Solie | ........................ | H02J 7/02 |
| | | | | 323/225 |
| 2014/0239925 A1 | 8/2014 | Tanabe et al. | | |
| 2015/0222171 A1 | 8/2015 | Nguyen et al. | | |

* cited by examiner

*Primary Examiner* — Kyle J Moody
(74) *Attorney, Agent, or Firm* — Dickinson Wright PLLC; Jonathan A. Schnayer

(57) ABSTRACT

Current sensing in switching power converters. At least one example is a method comprising: discharging an inductor of a buck converter using a low-side FET during a discharge mode of a first cycle; providing, during the discharge mode, a signal indicative of instantaneous current to a voltage regulator, the signal indicative of instantaneous current proportional to current through the inductor during at least a portion of the discharge mode; charging the inductor using a high-side FET during a charge mode, the charge mode in a second cycle subsequent to the discharge mode; and providing, during the charge mode, an emulated signal to the voltage regulator, the emulated signal generated based on the current through the inductor in the discharge mode.

17 Claims, 7 Drawing Sheets

METHODS AND SYSTEMS OF CURRENT SENSING IN SWITCHING POWER CONVERTERS

CROSS-REFERENCE TO RELATED APPLICATIONS

Not Applicable.

BACKGROUND

In the high performance computer market, such as severs in a data center, as the performance of the processors is increasing, the supply voltages to the processors is decreasing and supply current is increasing. The lower voltage and higher current operation of the processors may strain the DC-DC switching power converters that regulate the voltage. For example, a DC-DC switching power convert may be provided an unregulated input voltage between 10 Volts (V) and 15V, and the DC-DC switching power converter may produce a regulated output voltage of about 1.0V. The relatively large voltage differential between the unregulated input voltage and the regulated output voltage, in combination with the high current demand, may force the DC-DC switching power converter to operate at high switching frequencies.

SUMMARY

One example is a method of operating a switching power converter, the method comprising: discharging an inductor of a buck converter using a low-side FET during a discharge mode of a first cycle; providing, during the discharge mode, a signal indicative of instantaneous current to a voltage regulator, the signal indicative of instantaneous current proportional to current through the inductor during at least a portion of the discharge mode; charging the inductor using a high-side FET during a charge mode, the charge mode in a second cycle subsequent to the discharge mode; and providing, during the charge mode, an emulated signal to the voltage regulator, the emulated signal generated based on the current through the inductor in the discharge mode.

In the example method, providing the signal indicative of instantaneous current to the voltage regulator may further comprise driving the signal indicative of instantaneous current to a first terminal of a power module; and providing the emulated signal may further comprise driving the emulated signal to the first terminal of the power module.

In the example method, providing the emulated signal may further comprise: sensing that the buck converter is in non-transient operation; and providing, during the charge mode of the second cycle, a signal indicative of average current to the voltage regulator, the signal indicative of average current having a magnitude proportional to an average current through the inductor during at least a portion of the first cycle. Providing the signal indicative of instantaneous current during the discharge mode may further comprise sensing a voltage drop across the low-side FET, and driving the signal indicative of instantaneous current proportional to the voltage drop across the low-side FET; and providing the signal indicative of average current may further comprise: generating, during the first cycle, the signal indicative of average current through the inductor during the discharge mode; and driving, during the charge mode of the second cycle, the signal indicative of average current. Sensing that the buck converter is in non-transient operation may further comprise sensing that a discharge mode has a duration longer than a blanking time for measuring voltage drop across the low-side FET.

In the example method, providing the emulated signal may further comprise: sensing that the buck converter is in transient operation; and providing a ramp signal to the voltage regulator, the ramp signal having a slope proportional to an absolute value of a slope of the signal indicative of instantaneous current in the discharge mode. Sensing that the buck converter is in transient operation may further comprise sensing that a discharge mode has a duration shorting than a blanking time for measuring voltage drop across the low-side FET.

In the example method, providing the emulated signal further comprise: sensing that a discharge mode has a duration shorting than a blanking time for measuring voltage drop across the low-side FET; and responsive to the discharge mode having a duration shorting than a blanking time, providing a ramp signal to the voltage regulator, the ramp signal having a slope proportional to an absolute value of a slope of the signal indicative of instantaneous current in the discharge mode.

Yet another example is a power module comprising: a switch-node terminal, a PWM-input terminal, and a monitor-output terminal; a high-side FET defining a drain, a source coupled to the switch-node terminal, and a gate; a low-side FET defining drain coupled to the switch-node terminal, a source, and a gate; and a controller coupled to the gate of the high-side FET, the gate of the low-side FET, the PWM-input terminal, and the monitor-output terminal. The controller may be configured to: responsive to de-assertion of the PWM-input terminal, make the high-side FET non-conductive and the low-side FET conductive to define a discharge mode in a first cycle; drive, during the discharge mode, a signal indicative of instantaneous current to the monitor-output terminal, the signal indicative of instantaneous current directly proportional to voltage drop across the low-side FET during at least a portion of the discharge mode; responsive to assertion of the PWM-input terminal, make the low-side FET non-conductive and the high-side FET conductive to define a charge mode in a second cycle subsequent to the first cycle; and drive, during the charge mode of the second cycle, an emulated signal to the monitor-output terminal, the emulated signal generated based on the current through the low-side FET in the first cycle.

In the example power module, when the controller drives the emulated signal to the monitor-output terminal, the controller may be further configured to: sense non-transient operation; and drive, during the charge mode of the second cycle, a signal indicative of average current to the monitor-output terminal, the signal indicative of average current having a magnitude proportional to an average current through the low-side FET during at least a portion of the first cycle. When the controller drives the signal indicative of average current to the monitor-output terminal, the controller may be further configured to: generate, during the first cycle, an intermediate signal indicative of average current through low-side FET during the discharge mode; and drive, during the charge mode of the second cycle, the signal indicative of average current based on the intermediate signal indicative of average current. When the controller senses the non-transient operation, the controller may be further configured to sense that a discharge mode has a duration longer than a blanking time for measuring a voltage drop across the low-side FET.

In the example power module, when the controller drives the emulated signal to the monitor-output terminal, the controller may be further configured to: sense transient operation; and drive, during the charge mode of the second cycle, a ramp signal to the monitor-output terminal, the ramp signal having a slope proportional to an absolute value of a slope of the signal indicative of instantaneous current in the discharge mode. When the controller senses the transient operation, the controller is further configured to sense that a discharge mode has a duration shorting than a blanking time for measuring a voltage drop across the low-side FET.

Yet another example is a system comprising: an inductor defining a first lead and a second lead coupled to a load; a voltage regulator defining a voltage-monitor input coupled to the second lead, a PWM output, and a current-monitor input; and a power module defining a switch node coupled to the first lead, a PWM input coupled to the PWM output, and a monitor output coupled to the current-monitor input. The power module may comprise: a high-side FET defining a source coupled to the switch node and a gate; a low-side FET defining drain coupled to the switch node, and a gate; and a controller coupled to the gate of the high-side FET, the gate of the low-side FET, the PWM input, and the current-monitor input of the voltage regulator. The controller may be configured to: responsive to de-assertion of the PWM input, make the high-side FET non-conductive and the low-side FET conductive to discharge the inductor during a discharge mode of a first cycle; drive, during the discharge mode, a signal indicative of instantaneous current to the current-monitor input, the signal indicative of instantaneous current proportional to an instantaneous current through the inductor during at least a portion of the discharge mode; responsive to assertion of the PWM input, make the low-side FET non-conductive and the high-side FET conductive to charge the inductor during a charge mode of a second cycle subsequent to the first cycle; and drive, during the charge mode of the second cycle, an emulated signal to the current-monitor input, the emulated signal generated based on the current through the inductor in the first cycle.

In the example system, when the controller drives the emulated signal to the current-monitor input, the controller is further configured to: sense a non-transient operation of the system; and drive, during the charge mode of the second cycle, a signal indicative of average current to the current-monitor input, the signal indicative of average current having a magnitude proportional to an average current through the inductor during at least a portion of the first cycle.

In the example system, when the controller drives the signal indicative of instantaneous current to the current-monitor input, the controller is further configured to sense a voltage drop across the low-side FET, and drive the signal indicative of instantaneous current proportional to the voltage drop across the low-side FET, and when the controller drives the signal indicative of average current to the current-monitor input, the controller may be further configured to: generate an intermediate signal indicative of average current through the inductor during the discharge mode of the first cycle; and drive, during the charge mode of the second cycle, the signal indicative of average current based on the intermediate signal indicative of average current. When the controller senses the non-transient operation, the controller may be further configured to sense that a discharge mode has a duration longer than a blanking time for measuring voltage drop across the low-side FET.

In the example system, when the controller drives the emulated signal to the current-monitor input, the controller may be further configured to: sense transient operation of the system; and drive, during the charge mode of the second cycle, a ramp signal to the current-monitor input, the ramp signal having a slope proportional to an absolute value of a slope of the signal indicative of instantaneous current in the discharge mode of the first cycle. When the controller senses the transient operation, the controller is further configured to sense that a discharge mode has a duration shorting than a blanking time for measuring voltage drop across the low-side FET.

BRIEF DESCRIPTION OF THE DRAWINGS

For a detailed description of example embodiments, reference will now be made to the accompanying drawings in which.

DEFINITIONS

Figure 1:
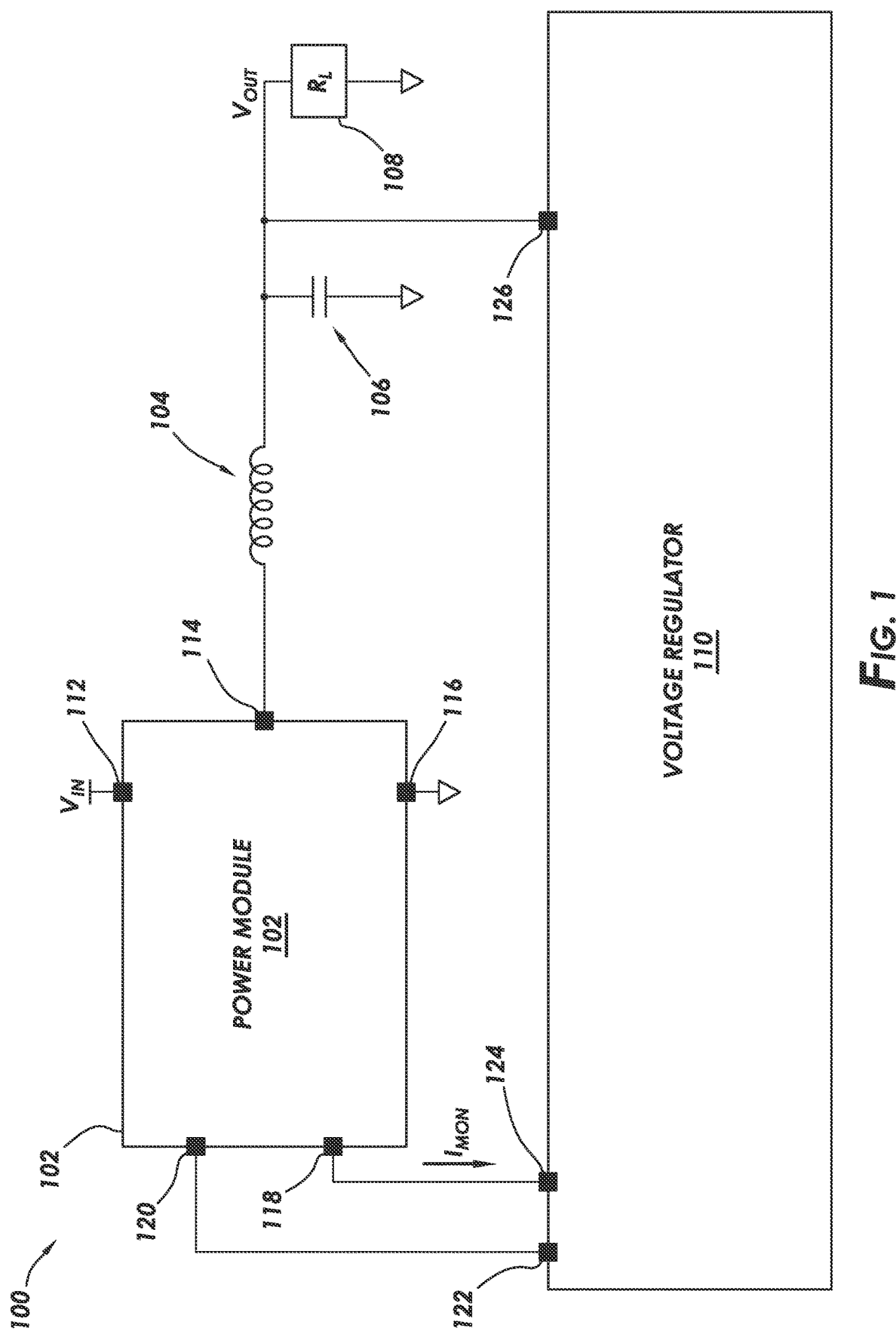
FIG. 1 shows system in accordance with at least some embodiments.

Various terms are used to refer to particular system components. Different companies may refer to a component by different names—this document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

"About" in reference to a recited parameter shall mean the recited parameter plus or minus ten percent (+/−10%) of the recited parameter.

"AC" shall mean alternating current.

"DC" shall mean direct current.

"FET" shall mean a field effect transistor, such as a junction-gate FET (JFET) or metal-oxide-silicon FET (MOSFET).

"Closing" in reference to an electrically-controlled switch (e.g., a FET) shall mean making the electrically-controlled switch conductive. For example, closing a FET used as an electrically-controlled switch may mean driving the FET to the fully conductive state.

"Opening" in reference to an electrically-controlled switch (e.g., a FET) shall mean making the electrically-controlled switch non-conductive.

The terms "input" and "output" when used as nouns refer to connections (e.g., electrical, software), and shall not be read as verbs requiring action. For example, a timer circuit may define a clock output. The example timer circuit may create or drive a clock signal on the clock output. In systems implemented directly in hardware (e.g., on a semiconductor substrate), these "inputs" and "outputs" define electrical connections. In systems implemented in software, these "inputs" and "outputs" define parameters read by or written by, respectively, the instructions implementing the function.

"Assert" shall mean changing the state of a Boolean signal. Boolean signals may be asserted high or with a higher voltage, and Boolean signals may be asserted low or with a lower voltage, at the discretion of the circuit designer. Similarly, "de-assert" shall mean changing the state of the Boolean signal to a voltage level opposite the asserted state.

"Controller" shall mean, alone or in combination, individual circuit components, an application specific integrated circuit (ASIC), a microcontroller with controlling software, a reduced-instruction-set computing (RISC) with controlling software, a digital signal processor (DSP), a processor with controlling software, a programmable logic device (PLD), a field programmable gate array (FPGA), or a programmable system-on-a-chip (PSOC), configured to read inputs and drive outputs responsive to the inputs.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Various examples are directed to methods and systems of current sensing in switching power converters. More particularly, various examples are directed to creating a current-monitor signal (Imon) provided from a power module to a voltage regulator, where the current-monitor signal is generated during discharge modes by measuring the voltage drop across a low-side FET and driving the current-monitor signal proportional to the voltage drop across the low-side FET. The voltage drop across the low-side FET is proportional to the current flow through the inductor during the discharge mode. During charge modes, the power module provides an emulated signal, where nature of the emulated signal is based on an operational state of the power converter. For example, during non-transient operation, the emulated signal is a signal indicative of the average current through the inductor in a previous discharge mode, such as the immediately previous discharge mode. During transient operation, the emulated signal is a ramp signal having a slope proportional to the slope of the inductor current in a previous discharge mode, such as an immediately previous discharge mode. In this way, the power module provides the current-monitor signal within accuracy limits without measuring voltage drop across the high-side FET during charge modes. The specification now turns to an example system to orient the reader.

FIG. 1 shows an example system 100. In particular, FIG. 1 shows a power module 102, an inductor 104, a smoothing capacitor 106, a load 108 (shown as $R_L$), and a voltage regulator 110. The example power module 102 defines an input voltage terminal 112 coupled to the input voltage $V_{IN}$, a switch-node terminal 114, a reference-voltage terminal 116 coupled to a reference voltage (e.g., ground or common), a monitor-output terminal 118, and PWM-input terminal 120. The example inductor 104 defines a first lead coupled to the switch-node terminal 114, and the switch-node terminal 114 and the first lead thus define the switch node of the system. The second lead of the inductor 104 defines the output voltage $V_{OUT}$ lead or terminal, and the second lead is coupled the load 108. The smoothing capacitor 106 defines a first lead coupled to the second lead of the inductor 104 and thus the output voltage $V_{OUT}$, and a second lead coupled to the reference voltage. The example voltage regulator 110 defines a PWM output 122 coupled to the PWM-input terminal 120, a monitor input 124 coupled to the monitor-output terminal 118, and a feedback input 126 coupled to the output voltage $V_{OUT}$.

In one example, the input voltage $V_{IN}$ may range from 10V to 15V. The output voltage $V_{OUT}$ may be selectable, at the design stage, in a range from between and including 0.8V and 1.8V, in some cases 1.0V. Thus, the power module 102 and the inductor 104 are arranged as a buck converter or for buck-type operation. The example of FIG. 1 shows the voltage regulator 110 associated with a single power module 102. However, in practice the voltage regulator 110 may couple to and control an array of power modules, with each power module in the array operating in a phased manner to provide voltage and current to the shared load 108.

In operation, the voltage regulator 110 asserts the PWM-input terminal 120 of the power module 102 to begin a charge mode of the inductor 104. In the charge mode, the power module 102 couples the input voltage $V_{IN}$ to the switch node defined by the switch-node terminal 114. However, because current through an inductor cannot change instantaneously, during the charge mode the current through the inductor 104 ramps upward as energy is stored the field around the inductor 104. The voltage regulator 110 then de-asserts the PWM-input terminal 120 to begin a discharge mode of the inductor 104. In the discharge mode, the power module 102 couples the reference voltage at the reference voltage terminal 116 to the switch node defined by the switch-node terminal 114. Again however, because current through the inductor 104 cannot change instantaneously, during the discharge mode the field around the inductor collapses as the inductor 104 continues to provide current to the smoothing capacitor 106 and load 108. A charge mode and contiguous discharge mode constitutes a single cycle of the operation of the buck converter.

The example voltage regulator 110 may be a part number FD3501 or part number FD5001 available from On Semiconductor, Phoenix, Arizona. The example voltage regulator 110 receives two feedback signals for operation of the system 100. The first feedback signal is an indication of output voltage $V_{OUT}$ received by way the feedback input 126. The second feedback signal is a current-monitor signal (Imon) driven from the monitor-output terminal 118 to the monitor input 124 of the voltage regulator 110. In particular, the example system 100 does not directly measure load current with a current sensor (e.g., current sensor associated with the second lead of the inductor 104). Rather, in the example system the power module 102 is designed and constructed to generate and provide the current-monitor signal to the voltage regulator 110, and based on the current-monitor signal the voltage regulator 110 controls the frequency of assertion of the PWM-input terminal 120.

In some example systems, the amount of energy supplied from the input voltage $V_{IN}$ to the output voltage $V_{OUT}$ is directly proportional to the frequency of operation. For example, as the load 108 increases, drawing higher current, the frequency of the PWM signal applied to the PWM-input terminal 120 increases. As the load 108 decreases, drawing less current, the frequency of the PWM signal applied to the PWM-input terminal 120 decreases. The specification now turns to example waveforms to explain various time frames of interest.

Figure 2:
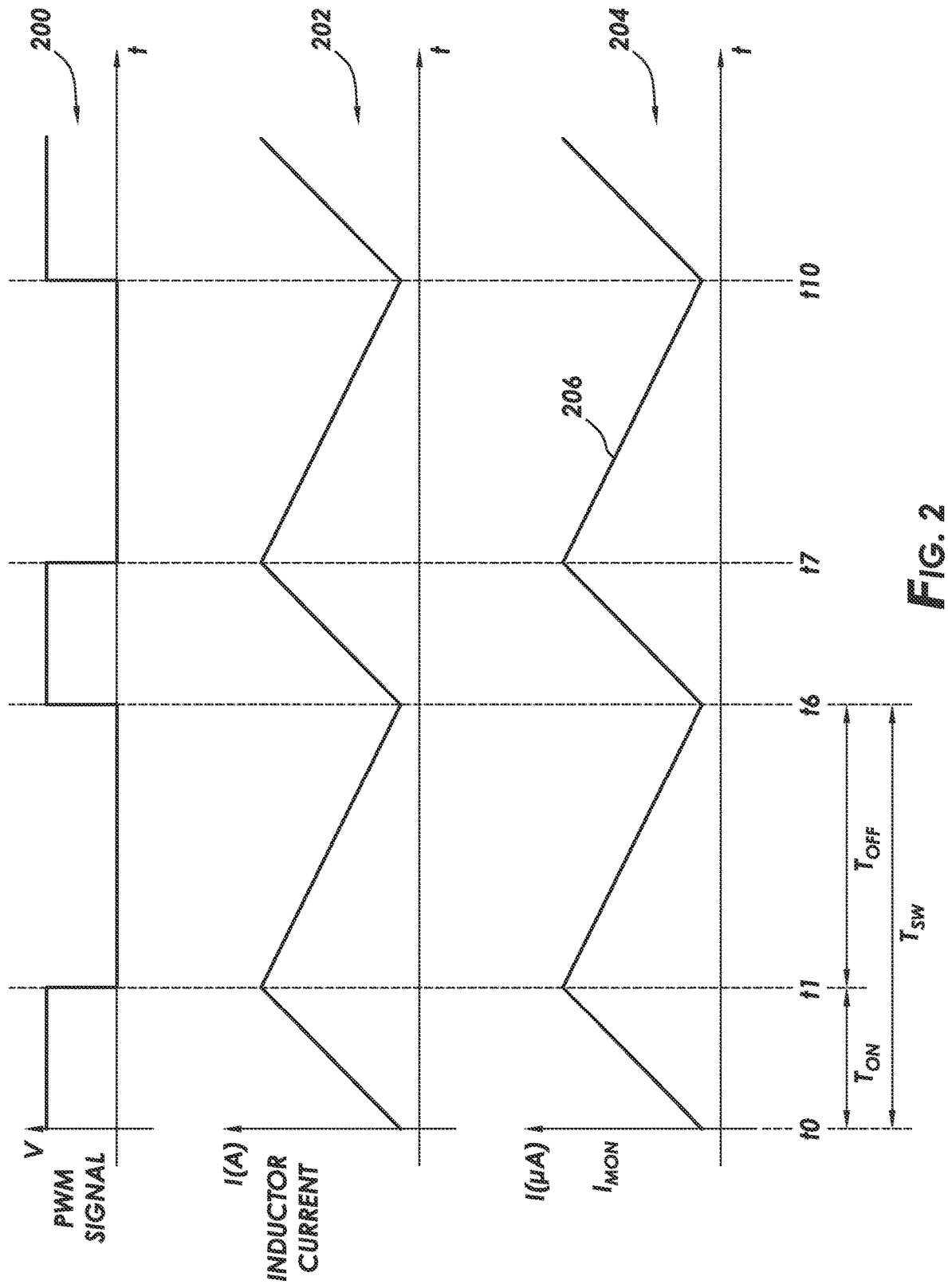
FIG. 2 shows a timing diagram in accordance with at least some embodiments.

FIG. 2 shows an example timing diagram. In particular, FIG. 2 shows: plot 200 showing an example PWM signal; plot 202 showing inductor current; and plot 204 showing an example current-monitor signal of the related-art. The plots are shown on corresponding time axes, but the plots are not necessarily to scale. Referring initially to the PWM signal of plot 200. Between time t0 and time t1, the example PWM signal is shown asserted, here asserted high or with a high voltage. It is noted that the asserted state (e.g., high voltage or low voltage) of the PWM signal may be selected at the discretion of the circuit designer. The duration between t0 and t1 may be referred to as the charge mode or $T_{ON}$, referring to the period of time that the inductor 104 (FIG. 1) is coupled to the input voltage $V_{IN}$ through the power module 102 (FIG. 1). Between time t1 and t6, the example PWM signal is shown de-asserted, here de-asserted low or with a low voltage. The time duration between t1 and t6 may be referred to as the discharge mode or $T_{OFF}$, referring to the period of time that the first lead of the inductor 104 is coupled to the reference voltage (e.g., ground) through the power module 102. The time duration between time t0 and time t6 is the switching period $T_{SW}$, and the inverse of the switching period $T_{SW}$ is the switching frequency. In example cases, the time duration between t0 and t6 (i.e., the switching period $T_{SW}$) is referred to as a switching cycle or just cycle and is made up of a single charge mode and a contiguous single discharge mode. In the example of FIG. 2, the time duration between t6 and t10 is a second cycle, the cycle subsequent to and contiguous with the first cycle between times t0 and t6. Thus, FIG. 2 shows two complete cycles, and one partial cycle (to the right of t10).

Plot 202 shows the inductor current over time. For example, during the charge mode between times t0 and t1, the first lead of the inductor 104 (FIG. 1) is coupled to the input voltage $V_{IN}$, and thus the inductor current is rising over time. At time t1, the voltage regulator 110 (FIG. 1) de-asserts the PWM signal, and thus the power module 102 (FIG. 1) de-couples the first lead of the inductor from the input voltage $V_{IN}$ and couples the first lead of the inductor 104 to the reference voltage (e.g., ground). Thus, during the discharge mode between times t1 and t6 the inductor current falling over time. The subsequent charge mode begins anew at time t6.

A few points about the plots 200 and 202. First, the example plots represent a non-transient operation. That is, the load current (e.g., the average current) provided from the example system is relatively steady for the example PWM signal of plot 200 and the example inductor current of plot 202. The specification expressly discusses transient operation in greater detail below. Second, in example systems, neither the power module 102 nor the voltage regulator 110 measure the inductor current of plot 202 directly. The plot 202 is shown to orient the reader the ideas of charge mode or on time $T_{ON}$, discharge mode or off time $T_{OFF}$, and switching cycles.

In related-art systems the power modules provide to the voltage regulator a current-monitor signal that is a scaled version of the sawtooth waveform of the inductor current of plot 202. Plot 204 of FIG. 2 shows an example current-monitor signal 206 that may be provided from the related-art power modules, with the current-monitor signal 206 reproducing the sawtooth waveform of the inductor current. The current-monitor signal created by related-art power modules may be created by use of a current sensor within the power module (e.g., a current transformer created in silicon, or a low resistance shunt resistor). In other cases in related-art systems, the portion of the current-monitor signal during the charge mode may be created by measuring voltage drop across a high-side switch (i.e., the switch that couples the input voltage $V_{IN}$ to the switch node), and driving the current monitor signal proportional to the voltage drop across the high-side switch. However, as the output voltage $V_{OUT}$ decreases relative to input voltage $V_{IN}$, and as switching frequencies continue to increase, the time duration of each charge mode becomes increasingly shorter. The short duration charge modes make measuring voltage drop across a high-side switch, as a proxy for inductor current, increasingly difficult to implement.

The inventors of the present specification discovered that power modules need not reproduce, by way of the current-monitor signal, the full sawtooth waveform of the inductor current (in scaled form). Rather, the inventors of the present specification discovered that, so long as the current-monitor signal has an average value within a predetermined tolerance (e.g., 3%) of the actual average value, the current-monitor signal need not reproduce the full sawtooth waveform. Stated otherwise, the current-monitor signal may reproduce only portions the sawtooth waveform, and the remaining portions may be emulated signals that do not track the sawtooth waveform and still the overall cycle-by-cycle average accuracy is present.

Returning to FIG. 1. In various examples, during each discharge mode the power module 102 is designed and constructed to provide a signal indicative of instantaneous current to the monitor input 124 of the voltage regulator 110. The signal indicative of instantaneous current is proportional to current through the inductor during at least a portion of the discharge mode. In a subsequent charge mode, such as an immediately subsequent charge mode, the power module 102 is designed and constructed to provide an emulated signal to the monitor input 124 of the voltage regulator 110. The emulated signal takes different forms depending on the operational state of the system 100. In non-transient operation (e.g., shown in FIG. 2), the emulated signal is a signal indicative of average current through the inductor 104 during a previous discharge mode, such as the immediately previous discharge mode. In transient operation, the emulated signal is a ramp signal have a slope proportional to an absolute value of a slope of the signal indicative of instantaneous current in a previous discharge mode, such as the immediately previous discharge mode. In this way, the voltage regulator 110 is provided a current-monitor signal that has an average value that closely matches the actual average value.

Figure 3:
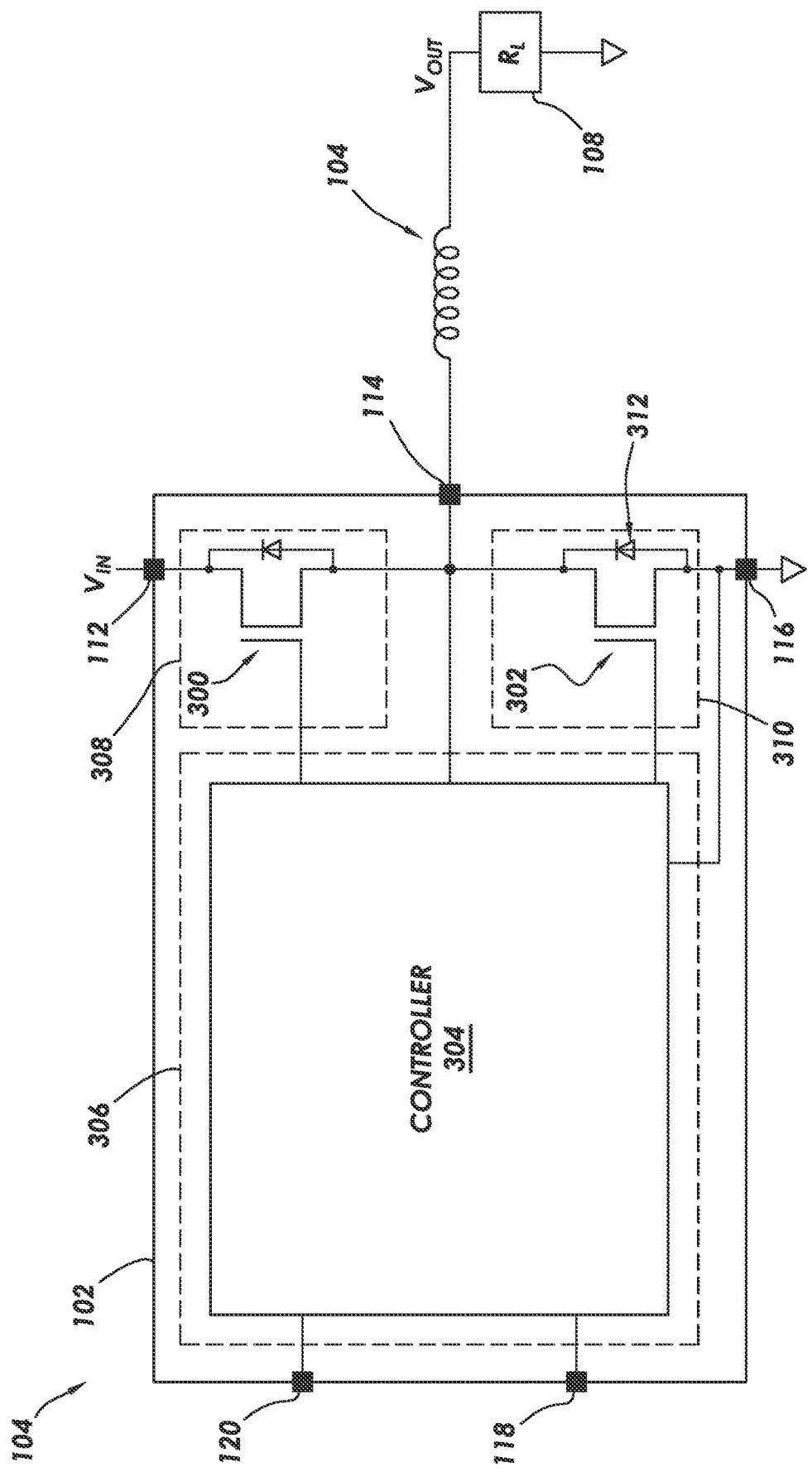
FIG. 3 shows a partial electrical schematic, partial block diagram, of a power module in accordance with at least some embodiments.

FIG. 3 shows a partial electrical schematic, partial block diagram, of an example power module 102. In particular, FIG. 3 shows the input-voltage terminal 112, the switch-node terminal 114, the reference-voltage terminal 116, the monitor-output terminal 118, and the PWM-input terminal 120. Other terminals may be present, but such additional terminals are not shown or described so as not to unduly complicate the discussion. Internally, the example power module 102 implements a high-side electrically-controlled switch illustratively shown as a FET (and hereafter high-side FET 300). The example high-side FET 300 defines a drain coupled to the input-voltage terminal 112, a source coupled to the switch-node terminal 114, and a gate. The example power module further implements a low-side electrically-controlled switch illustratively shown as a FET (and hereafter low-side FET 302). The example low-side FET 302 defines a drain coupled to the switch-node terminal 114, a source coupled to the reference-voltage terminal 116, and a gate. The example power module 102 further implements a controller 304. The controller 304 is coupled to the gate of the high-side FET 300, the switch-node terminal 114, the gate of the low-side FET 302, the reference-voltage terminal 116, the monitor-output terminal 118, and the PWM-input terminal 120. To aid in the further discussion, also shown in FIG. 3 are the input voltage $V_{IN}$, the reference voltage (e.g., ground or common), the inductor 104, and the load 108.

The electrical devices of the power module 102 may be monolithically created on one more substrates and encapsulated within packaging to form a packaged-semiconductor product or packaged-semiconductor device. For example, the controller 304 may be constructed on a substrate 306, the high-side FET 300 may be constructed on a substrate 308 distinct from the substrate 306, and the low-side FET 302 may be constructed on a substrate 310 distinct from the other substrates. All three substrates may be electrically coupled to each other and co-packaged (e.g., multi-chip module). In other cases, the controller 304 and low-side FET 302 may be constructed on the same substrate and packaged with a distinct substrate 308 for the high-side FET 300. The various terminals may be electrical connections or pins accessible on the outside surface of the packaging.

The example controller 304 may be, alone or in combinations, individual circuit components, an application specific integrated circuit (ASIC), a microcontroller with controlling software, a reduced-instruction-set computing (RISC) with controlling software, a digital signal processor (DSP), a processor with controlling software, a programmable logic device (PLD), a field programmable gate array (FPGA), or a programmable system-on-a-chip (PSOC), configured to read inputs and drive outputs responsive to the inputs. The discussion now turns to operation of the power module 102 in greater detail.

Because the operation of the power module 102 in the charge mode is controlled in part by various readings and measurements taken during a prior discharge mode (e.g., the immediately previous discharge mode), the discussion of operation begins with a description of the discharge mode. In particular, in a prior charge mode, the PWM-input terminal 120 is asserted and the high-side FET 300 is conductive. Responsive to de-assertion of the PWM-input terminal 120, the example controller 304 is designed and constructed to de-assert the gate of the high-side FET 300, and after a blanking time assert the gate of the low-side FET 302. Stated otherwise, responsive to de-assertion of the PWM-input terminal 120 the controller 304 makes the high-side FET 300 non-conductive, thus beginning the discharge mode.

The blanking time (e.g., between 100 and 200 nanoseconds (ns)) ensures the input voltage $V_{IN}$ is not shorted to the reference voltage through the FETs. Stated otherwise, the blanking time ensures there is no cross-conduction of the input voltage $V_{IN}$ through the FETs to the ground or common. Within the discharge mode but during the blanking time, current drawn by the inductor 104 flows through the body diode 312 of the low-side FET 302. After the blanking time, the controller 304 asserts the gate of the low-side FET 302 to make the low-side FET 302 fully conductive. Thus, the downward ramping current through the inductor 104 is drawn first through the body diode 312, and then through the low-side FET 302 itself.

During the discharge mode, the controller 304 is designed and constructed to drive, to the monitor-output terminal 118, a signal indicative of instantaneous current through the inductor 104. In example cases, the signal indicative of instantaneous current is created by measuring the voltage drop across the low-side FET 302 during the discharge mode. That is, even in a fully conductive state, the low-side FET 302 has an inherent resistance (Rds(on)). Thus, the current through the low-side FET 302 produces a voltage drop with a magnitude over time directly proportional to the magnitude over time of the current through the inductor 104.

In an ideal case, the controller 304 measures the voltage drop across the low-side FET 302 at all times during the discharge mode as an indication of current flow through the inductor 104. However, during the blanking time, the low-side FET 302 is non-conductive and the inductor current is drawn through the body diode 312. Thus, during the blanking time the voltage drop across the low-side FET 302 is limited to the diode forward voltage drop. Moreover, the various electrical circuits used to measure the voltage drop across the low-side FET 302 have a settling time (e.g., between 100 and 200 ns), and thus during the settling time the readings may not be stable. In some examples, the controller 304 is designed and constructed to drive the signal indicative of instantaneous current to the monitor-output terminal 118 starting at the end of the blanking time. The discussion now turns to an immediately subsequent charge mode.

Responsive to assertion of the PWM-input terminal 120, the example controller 304 is designed and constructed to de-assert to the gate of the low-side FET 302, and after another blanking time, assert the gate the gate of the high-side FET 300. Stated otherwise, responsive to assertion of the PWM-input terminal 120 the controller 304 makes the low-side FET 302 non-conductive and the high-side FET 300 conductive, thus beginning a charge mode.

During the charge mode, the controller 304 is designed and constructed to drive, to the monitor-output terminal 118, an emulated signal generated based on the current through the inductor in the prior discharge mode. In particular, during non-transient operation, the controller 304 is designed and constructed to drive a signal indicative of average current having a magnitude proportional to an average current through the inductor during at least a portion of the last discharge mode.

Figure 4:
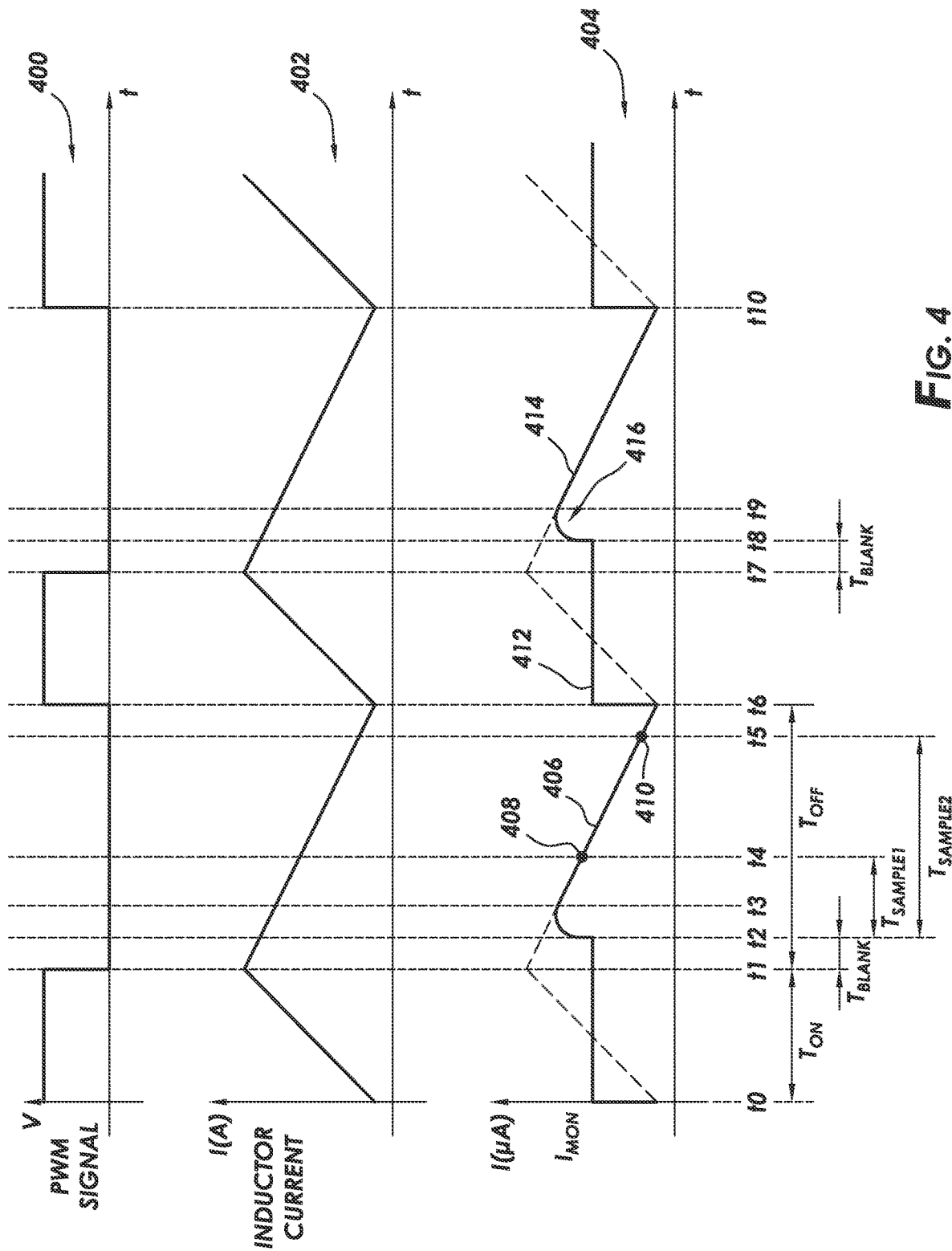
FIG. 4 shows a timing diagram, during non-transient operation, in accordance with at least some embodiments.

FIG. 4 shows an example timing diagram. In particular, FIG. 4 shows: plot 400 showing an example PWM signal; plot 402 showing inductor current; and plot 404 showing an example current-monitor signal provided from the power module to the voltage regulator. The plots are shown on corresponding time axes, but the plots are not necessarily to scale. Referring initially to the PWM signal of plot 200. As before, between time t0 and time t1 the example PWM signal is shown asserted to define the charge mode of the inductor 104 (FIG. 1). Between time t1 and t6, the example PWM signal is shown de-asserted to define the discharge mode of the inductor 104. Again as before, the time duration between t6 and t10 is a second cycle, the second cycle subsequent to and contiguous with the first cycle between times t0 and t6.

Again as before plot 402 shows the inductor current over time. Between times t0 and t1 is the charge mode with the inductor current rising over time. Between times t1 and t6 is the discharge mode with the inductor current falling over time. Again, the example plots represent a non-transient operation. Moreover, in example cases neither the power module 102 nor the voltage regulator 110 measure the inductor current of plot 202 directly. The plot 402 is shown as a reference regarding the actual inductor current over time.

Before addressing the specifics of the current-monitor signal produced by the example power module 102 (FIG. 3), a few additional time frames or time durations are introduced. In particular, the time duration between time t1 and t2 ($T_{BLANK}$) is the blanking time discussed above, and used to ensure there is no cross-conduction through the power module 102 between input voltage $V_{IN}$ and common or ground, and also used as a settling time for a measurement amplifier (discussed more below). Moreover, the time duration between time t2 and t3 is the setting time for a measurement circuit. Similarly for the second cycle shown, the time duration between time t7 and t8 is a blanking time, and the time duration between time t8 and t9 is a setting time for the measurement circuit.

Plot 404 shows an example current-monitor signal provided by the controller 304 (FIG. 3) to the monitor-output terminal 118 (FIG. 3). Following the sequence of discussing a discharge mode before discussing the charge mode, responsive to de-assertion of the PWM signal at time t1, the example controller 304 makes the high-side FET 300 non-conductive, thus beginning the discharge mode. During the blanking time between t1 and t2, the inductor 104 current flows through the body diode 312 of the low-side FET 302. After the blanking time, and starting at time t2, the controller 304 makes the low-side FET 302 conductive. Between times t2 and t6, and again in non-transient operation, the controller 304 provides or drives a signal 406 indicative of instantaneous current through the inductor. In the time duration between times t2 and t3, as the measurement circuit settles, the signal driven approaches the representation of the instantaneous current. And starting at time t3 the example signal 406 indicative of instantaneous current more closely matches the instantaneous current. The signal 406 indicative of instantaneous current may be scaled to be 5 micro-Amps (µA) of current-monitor signal for each amp of inductor current (5 µA/A). Co-plotted, in dashed line form, in plot 404 is a scaled version of the inductor current for reference.

The example controller 304 (FIG. 3) performs several measurements and calculations during the example discharge mode between times t1 and t6. For example, in measuring the voltage drop across the low-side FET 302 (FIG. 3) and generating the signal 406 indicative of instantaneous current, the controller 304 also creates a signal or value indicative average current through the inductor during the discharge mode. Though discussed in greater detail below, creating the value indicative of average current may involve low-pass filtering the signal 406 to arrive at the value indicative of average current. However, any averaging technique may be used.

Also during the example discharge mode between times t1 and t6, the example controller 304 determines or measures the slope of the signal 406 indicative of instantaneous current. For example, the controller 304 is designed and constructed to sample the magnitude of the signal 406 at time t4 (the sample indicated by dot 408). The controller 304 may sample the magnitude of the signal 406 at time t5 (prior to the end of the charge mode), as indicated by dot 410. The time duration between t2 and t4 may be referred to $T_{SAMPLE1}$. Similarly, the time duration between t2 and t5 may be referred to $T_{SAMPLE2}$. Using the two samples or the two magnitudes, the controller 304 calculates a value indicative of slope. During non-transient operation, and in the next cycle, the slope calculated may be used to correct the average current values for shortcomings associated with the blanking time and measurement settling time. Also, the slope may be used in a subsequent charge mode during transient operation to set the slope of a ramp signal.

Still referring to FIG. 4. Responsive to assertion of the PWM signal at time t6, the example controller 304 makes the low-side FET 302 non-conductive and makes high-side FET 300 conductive, thus beginning the charge mode of the next cycle. In accordance with various examples, between times t6 and at least t7, and in non-transient operation, the controller 304 provides or drives a signal 412 indicative of average current through the inductor. In example cases, the signal 412 indicative of average current through the inductor is based on the value indicative of average current created during the previous discharge mode, in this example the value indicative of average current created during times t2 and t6 of the immediately previous discharge mode. Stated otherwise, in spite of the fact that the actual inductor current (e.g., of plot 402) is ramping upward, the controller 304 is designed and constructed to provide signal 412 having a substantially constant magnitude, the magnitude proportional to the average current through the inductor in the previous discharge mode.

Responsive to de-assertion of the PWM signal at time t7, the example controller 304 makes the high-side FET 300 non-conductive, thus beginning the next discharge mode. In some examples, the controller 304 is designed and constructed to drive the signal 412 indicative of average current through blanking time (i.e., to time t8). The controller 304 is designed and constructed to begin driving a signal 414 proportional to voltage across the low-side FET 302 starting at time t8 even though the measurement circuit may not have yet settled. In particular, the example signal 414 indicative of instantaneous current comprises a settling portion 416 between times t8 and t9.

The example controller 304 will likewise perform measurements and calculations during the example discharge mode between times t7 and t10. For example, the example controller 304 creates anew the value indicative average current through the inductor during the discharge mode. The value indicative average current through the inductor may be used in a subsequent charge mode (e.g., the charge mode beginning at time t10). Moreover, the controller 304 may calculate the slope of the signal 414 indicative of instantaneous current, again for use in a subsequent charge mode (e.g., the charge mode beginning at time t10). The dots representing the sample times within the second cycle for calculating the slope are omitted so as onto to further complicate the figure.

The operation of the example power module 102 and related system 100 in reference to FIG. 4 assumes non-transient operation. That is, the discussion assumes that the voltage regulator 110 (FIG. 1), the power module 102 (FIG. 1), and the inductor 104 (FIG. 1) are providing substantially constant average current to the load 108 (FIG. 1). However, current drawn by the load 108 may be highly variable. For example, the load 108 in the example form of a server may go from lightly loaded to fully loaded in just a few cycles of the system 100. Thus, the discussion turns to operation of the example system in transient conditions.

Figure 5:
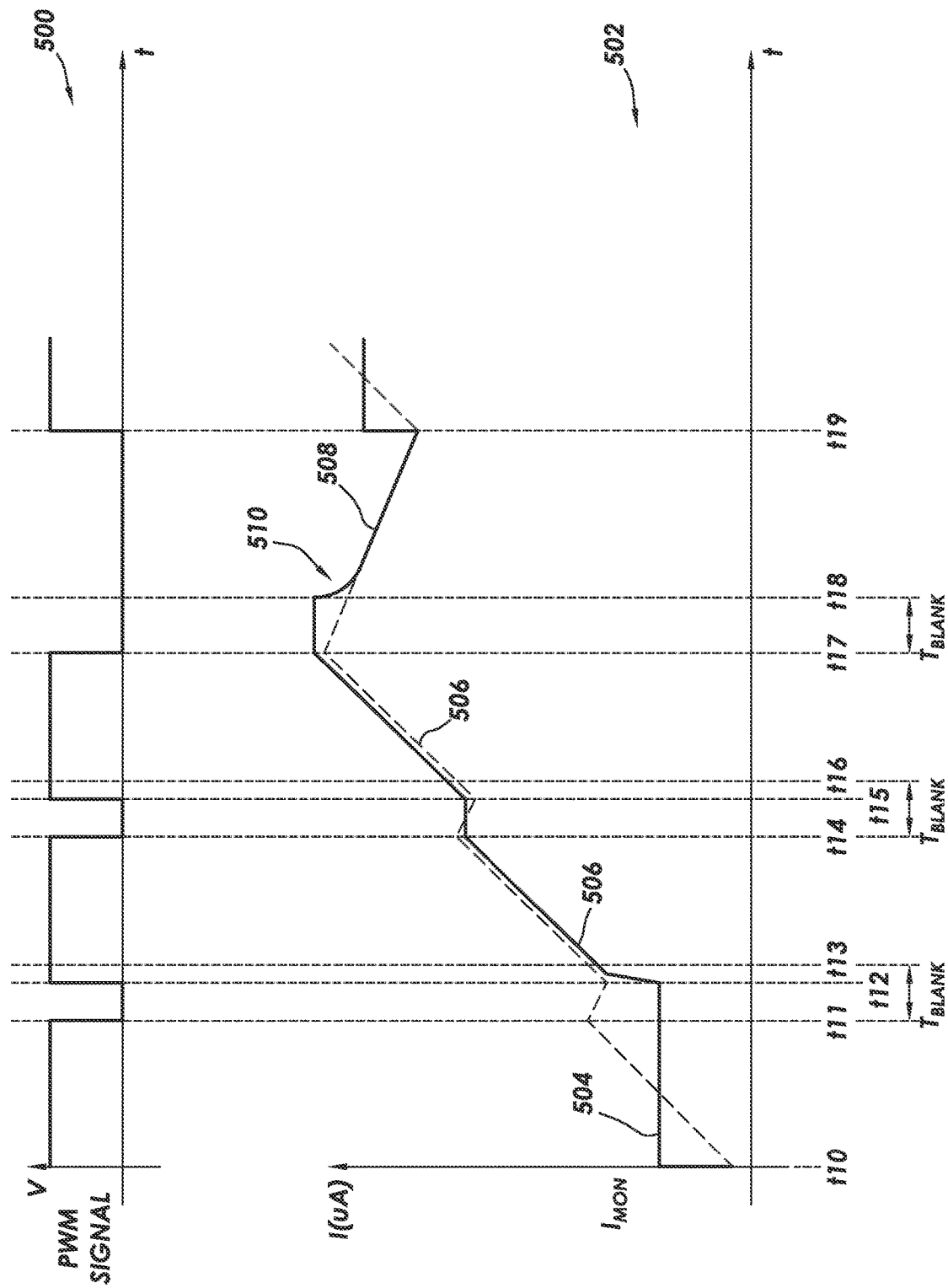
FIG. 5 shows a timing diagram, during transient operation, in accordance with at least some embodiments.

FIG. 5 shows an example timing diagram for transient operation. In particular, FIG. 5 shows: plot 500 showing an example PWM signal; and plot 502 showing an example current-monitor signal provided from the power module to the voltage regulator. The plots are shown on corresponding time axes, but the plots are not necessarily to scale. Referring initially to the PWM signal of plot 500. Between time t10 and time t11 the example PWM signal is shown asserted to define the charge mode of the inductor 104 (FIG. 1). Between time t11 and t12, the example PWM signal is shown de-asserted to define a discharge mode. In this example, the discharge mode is short, and the PWM signal of plot 500 is again asserted at times t12 through t14.

Another short discharge mode is defined between times t14 and t15, and again the PWM signal is asserted between times t15 and t17. Between times t17 and t19 the PWW signal is de-asserted, defining a longer discharge mode. The plot 500 of FIG. 500 thus shows an example transient operation in which the frequency of operation is increased because of higher current drawn by the load 108 (FIG. 1). Stated otherwise, the higher current drawn is provided, at least in part, by shortening the discharge modes. At time t17, the example transient operation effectively ends, and an extended-length discharge mode is present between times t17 and t19.

Turning to plot 502. For purposes of discussion, assume that operation of the example system prior to time t10 was non-transient operation. In that prior non-transient operation, a value indicative of average current was determined, and the slope of the prior signal indicative of instantaneous current was determined, as discussed above. An example (scaled) inductor current is shown in plot 502 (in dashed line form) for reference. Consistent with the prior operation, starting at time t10 the power module 102 (FIG. 3) provides a current-monitor signal being the signal 504 indicative of average current through the inductor during the last discharge mode. When the charge mode ends at time t11, the example power module 102 continues to the provide the signal 504 with goal of providing the signal 504 through and to the end of the blanking time at time t13. However, in the example of FIG. 5 the next charge mode begins at time t12—before the end of the blanking time at t13. Stated otherwise, the PWM signal is again asserted before the end of the blanking time $T_{BLANK}$. The next charge mode beginning within the blanking time $T_{BLANK}$ is an indication that the system is in transient operation. Thus, the power module 102 senses that the system is in transient operation and responsive thereto the power module 102 is designed and constructed to provide a ramp signal 506 to the voltage regulator 110 (FIG. 1). In one example, the ramp signal 506 has a slope proportional to an absolute value of a slope of the signal indicative of instantaneous current in the previous discharge mode. The ramp signal 506 is shown offset from the scaled version of the inductor current to show the correlation, but in practice the ramp signal 506 may closely match the scaled version of the inductor current.

The power module 102 continues to provide the example ramp signal 506 until the end of the charge mode at time t14. The peak value of the ramp signal at time t14 may be driven during the discharge mode, but in the example of FIG. 5 the next charge mode begins again at time t15, again before the expiration of the blanking time $T_{BLANK}$ at time t16. Thus again, in this example the ramp signal 506 is driven having a slope proportional to the absolute value of a slope of the signal indicative of instantaneous current in the previous discharge mode (i.e., the discharge mode prior to time t10). The ramp signal 506 between times t15 and t17 is again shown offset from the scaled version of the inductor current to show the correlation, but in practice the ramp signal 506 may closely match the scaled version of the inductor current.

Still referring to plot 502, at time t17 the charge mode ends, and in this case the discharge modes extends beyond the blanking time $T_{BLANK}$. Based on the discharge mode having a time duration longer than the blanking time $T_{BLANK}$, the power module 102 senses that the transient operation ended, and non-transient operation begins. Thus, the peak value of the ramp signal is driven during the blanking time $T_{BLANK}$ between t17 and t18. At the end blanking time $T_{BLANK}$, the power module again drives a signal 508 indicative of instantaneous current through the inductor, including an example settling portion 510, in this example settling from above the instantaneous value rather than below. The discussion now turns to an example electrical circuit to perform the noted functions.

Figure 6:
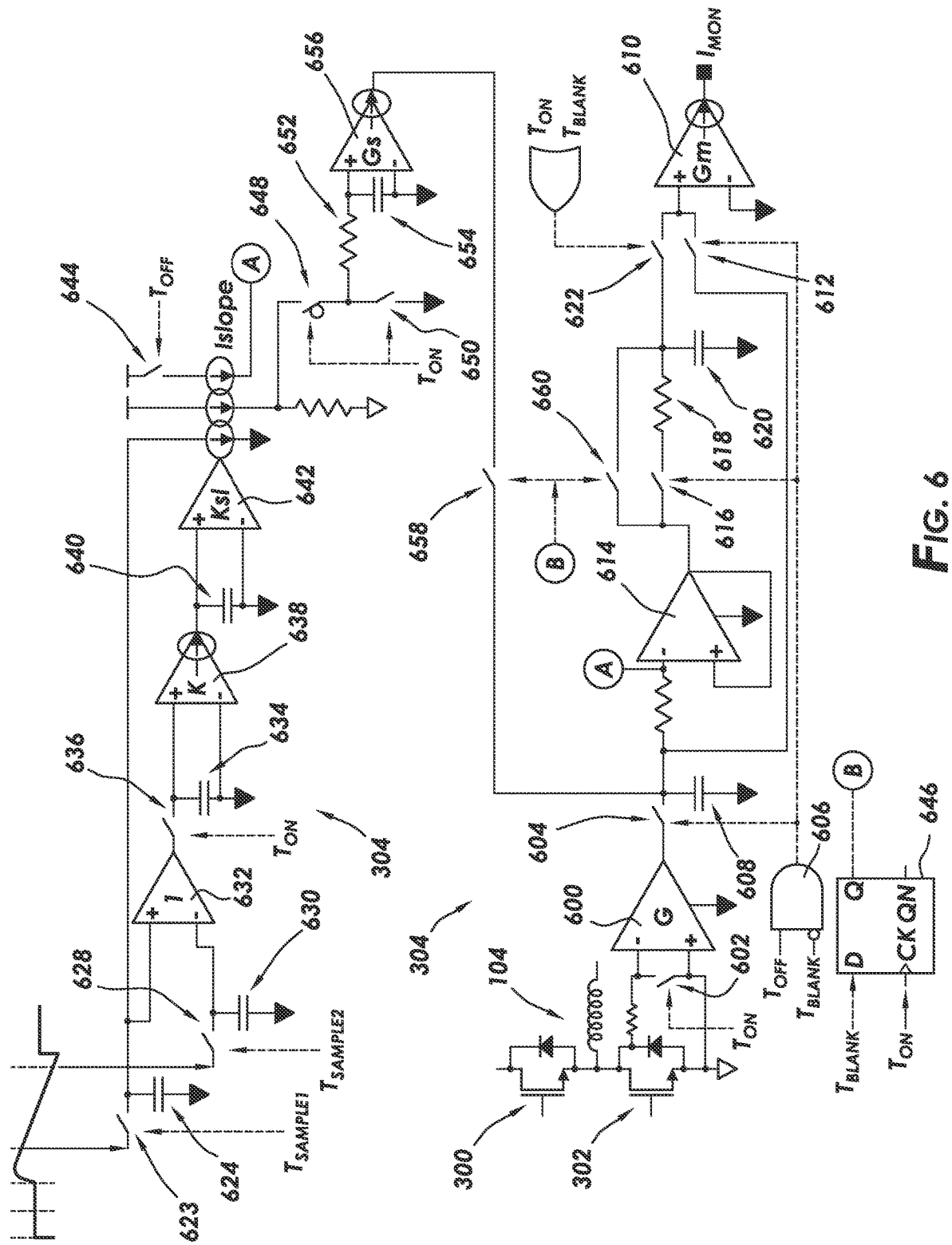
FIG. 6 shows a simplified electrical circuit, and related conceptual control logic, in accordance with at least some embodiments.

FIG. 6 shows an example electrical circuit. In particular, FIG. 6 shows the high-side FET 300, the low-side FET 302, and the inductor 104 to orient the circuit to the components previously introduced. Throughout the discussion of FIG. 6 are several signals related to the charge mode, the discharge mode, and the blanking time. So as not to unduly complicate the drawing, several signals are defined, but the hardware to implement the signals is not specifically shown so as not to further complicate the figure. The following signals are thus defined: a signal that is asserted during each charge mode, referred to as the $T_{ON}$ signal (e.g., the PWM signal); a signal that is asserted during each discharge mode, referred to as the $T_{OFF}$ signal (e.g., the logical NOT of the PWM signal); a signal that is asserted during each blanking time, referred to as the $T_{BLANK}$ signal; a signal that is asserted during each discharge mode starting at the end of the blanking time and de-asserted at the first sample time, referred to as the $T_{SAMPLE1}$ signal; and a signal that is asserted during each discharge mode starting at the end of the blanking time and de-asserted at the second sample time, referred to as the $T_{SAMPLE2}$ signal. The discussion starts with a discharge mode, and initially focuses on the lower half of FIG. 6.

The low-side FET 302 is associated with a sensing amplifier 600 defining an inverting input coupled to the switch node by way of a trim resistor, a non-inverting input coupled to the reference voltage, and a sense output. In example cases, the sense amplifier 600 is designed and constructed to have a gain G of about negative 5, the negative to account for the polarity of the voltage across the low-side FET 302, but any suitable gain may be used. The external resistors to implement the gain are not shown so as not to further complicate the figure. An electrically-controlled switch (hereafter just switch 602) is coupled between the inputs of the sensing amplifier 600. The switch 602 is closed or conductive during each charge mode, and open or non-conductive during each discharge mode. Thus, in this example the control input of the switch 602 is coupled to the $T_{ON}$ signal. When the switch 602 shorts the inputs of the sensing amplifier 600 during each charge mode, the sensing amplifier 600 is disabled. When the switch 602 opens during each discharge mode, the sensing amplifier 600 is enabled to read the voltage drop across the low-side FET 302.

The sense output of the sensing amplifier 600 is coupled to an electrically-controlled switch (hereafter just switch 604). In example systems, the switch 604 is closed or conductive during each discharge mode starting at the end of the blanking time $T_{BLANK}$. Hence, an example AND gate 606 is shown with an output coupled to the control input of switch 604, and with the inputs of the AND gate 606 coupled to the $T_{OFF}$ signal and the logical NOT of the $T_{BLANK}$ signal. It follows that, during the discharge mode but before the end of the end of the blanking period $T_{BLANK}$, the switch 604 is open or non-conductive. During the discharge mode and after the end of the blanking period $T_{BLANK}$, the switch 604 closes and the sense amplifier 600 drives a sense signal to the capacitor 608, where the sense signal is proportional to the voltage drop across the low-side FET 302. The settling portion 416 (of FIG. 4) and the settling portion 510 (of FIG. 5) may be attributable to the charging time of the capacitor 608 taking into account the inherent resistance of the switch 604.

Skipping for now the amplifier 614 in the lower middle, the next portion of the example circuit is a transconductance amplifier 610 on the lower right. The transconductance amplifier 610 defines a non-inverting input coupled to the first lead of the capacitor 608 by way of an electrically-controlled switch (hereafter switch 612), and an inverting input coupled to the reference voltage (e.g., ground or common). As a transconductance amplifier 610, the amplifier output is a current signal having a magnitude proportional to the voltage at the non-inverting input. In various examples, the switch 612 is closed or conductive during the same periods of time as the switch 604 (i.e., during the discharge mode after the blanking period), and thus the control input of switch 612 is coupled to the output of the AND gate 606. The transconductance amplifier 610 reads the voltage on the capacitor 608 and drives a current-monitor signal (Imon) having an instantaneous magnitude proportional to the instantaneous magnitude of the voltage on the capacitor 608 (i.e., the downward ramping signal). Stated otherwise, during the discharge mode after the blanking period, the transconductance amplifier 610 drives the signal indicative of instantaneous current based on the voltage drop across the low-side FET 302.

Returning now to the amplifier 614 in the lower middle. As discussed above, the controller 304 (FIG. 3) makes several measurements during each discharge mode. One of those measurements is a measurement of average current through the inductor during the discharge mode. To that end, the amplifier 614 defines a non-inverting input coupled to the first lead of the capacitor 608 by way of a resistor. The amplifier 614 defines an inverting input coupled to the follower output, and thus the amplifier 614 is a voltage follower—following the voltage on the capacitor 608. Downstream of the amplifier 614 is another electrically-controlled switch (hereafter switch 616). The first lead of switch 612 is coupled to the follower output of the amplifier 614, and the second lead is coupled to an averaging circuit. Inasmuch as the goal is to create the value indicative of average current during the discharge mode, the switch 616 is closed or conductive during the same periods of time as the switch 604 (i.e., during the discharge mode after the blanking period), and thus the control input of switch 616 is coupled to the output of the AND gate 606.

In the example of FIG. 6, the averaging circuit is an RC circuit comprising resistor 618 and capacitor 620. The RC circuit is effectively a low-pass filter designed and constructed to determine the average value of the voltage held on the capacitor 608. In order for the RC to determine the average, the time constant Tau of the RC circuit may need to be greater than provided by the following formula:

$$\text{Tau} > 1/(0.5 \times \pi \times Fsw_{MIN}) \quad (1)$$

where Tau is the time constant, and $Fsw_{MIN}$ is the minimum switching frequency. For a minimum switching frequency of 500 kHz, Tau may need to be at least 1 micro-second (µs). Thus, at the end of the discharge mode when the switch 616 is opened, the voltage on the capacitor 620 is the value indicative of average current.

Still referring to the lower half of FIG. 6, and now considering a subsequent charge mode during non-transient operation. During the subsequent charge mode in non-transient operation, the voltage held on the capacitor 620, being the value indicative of average current during the last discharge mode, is provided to the transconductance amplifier 610, and the transconductance amplifier 610 drives the current-monitor signal proportional to value indicative of average current (i.e., drives the signal indicative of average current). To that end, another electrically-controlled switch (hereafter just switch 622) has a first lead coupled to the first lead of the capacitor 620, a second lead coupled to the non-inverting input of the transconductance amplifier 610, and a control input. Inasmuch as the signal indicative of average current is driven during charge modes, and also driven during the blanking time of a subsequent discharge mode, the control input of the switch 622 may be coupled to the logical OR of the $T_{ON}$ signal and the $T_{BLANK}$ Signal.

Still referring to FIG. 6, and now referring to the upper-half of the drawings. In example systems the controller 304, during each discharge mode in non-transient operation, determines the slope of the signal indicative of instantaneous current through the inductor. FIG. 6 shows, in the upper left-hand corner, an example current-monitor signal during non-transient operation. During the discharge mode, the controller 304 is designed and constructed to sample, read, or measure two sample values, and from those two sample values generate various signals related to the slope. To that end, the example circuit comprises an electrically-controlled switch (hereafter switch 623) having a first lead coupled to a representation of the signal indicative of instantaneous current. In one example, the first lead of the switch is coupled to the first lead of the capacitor 608, but the connection is not shown so as not to further complicate the figure. The second lead of the switch 622 is coupled to the sample capacitor 624. The example switch 623 is conductive during each discharge starting at the end of the blanking period, and the example switch is opened or made non-conductive at the end of the first sample time. Thus, the control input of the switch 622 is coupled to the $T_{SAMPLE1}$ signal. In this way, the voltage on the sample capacitor 624 when the switch 624 opens is representative of the voltage of the signal indicative of instantaneous current at the first sample time.

The example circuit further implements another electrically-controlled switch (hereafter switch 628) having a first lead coupled to the representation of the signal indicative of instantaneous current (e.g., coupled to the first lead of the capacitor 608). The second lead of the switch 628 is coupled to a sample capacitor 630. The example switch 628 is conductive during each discharge starting at the end of the blanking period, and the example switch is opened or made non-conductive at the end of the second sample time. Thus, the control input of the switch 628 is coupled to the $T_{SAMPLE2}$ signal. In this way, the voltage on the sample capacitor 630 when the switch 628 opens is representative of the voltage of the signal indicative of instantaneous current at the second sample time.

The example circuit further comprises an amplifier 632 defining a non-inverting input coupled to the first lead of the sample capacitor 624, an inverting input coupled to the first lead of the sample capacitor 630, and a difference output. The example amplifier 632 has a unity gain, but any suitable gain may be used. After the switch 628 opens, the amplifier 632 produces a difference voltage having a magnitude proportional to the slope. The difference output of the amplifier 632 is coupled to sample-and-hold capacitor 634 by way of an electrically-controlled switch (hereafter switch 636). In particular, the example switch 636 is closed or made conductive momentarily after the second sample period $T_{SAMPLE2}$ such that the sample-and-hold capacitor 634 holds a voltage indicative of slope throughout the next cycle. For simplicity then, the control input of the switch 636 is shown coupled to the $T_{ON}$ signal, though the switch 636 can be opened at any point after the voltage on the sample-and-hold capacitor 634 settles.

The example controller 304 uses the slope in at least two ways. The first use of the slope is to correct small errors in the signal indicative of average current generated in each discharge mode, and driven during each charge mode. That is, if the current through the inductor 104 could be measured throughout the entire discharge mode, then the average current would be given by the following equation:

$$I_{AVG} = 0.5 I_{PEAK} \qquad (2)$$

where $I_{AVG}$ is the average current over the entire discharge mode, and $I_{PEAK}$ is the peak-to-peak current during the discharge mode. However, because of the blanking time, a small error is introduced. In accordance with example embodiments the slope may be used to correct the error in the signal indicative of average current introduced by the blanking time. In particular, the formula for average current during the non-blanking times of the discharge mode may be given by the following formula:

$$I_{BLANK\_AVG} = 0.5 I_{PEAK} - 0.5 T_{BLANK}(V_{OUT}/L) \qquad (3)$$

where $I_{BLANK\_AVG}$ is the average current during the non-blanking times of the discharge mode, $T_{BLANK}$ is the time duration of the blanking period, L is the inductance of the inductor 104, and the remaining variables are as discussed above. It follows that, to correct the small error introduced by the blanking time, the second portion of Equation (3) (i.e., 0.5 $T_{BLANK}$ ($V_{OUT}/L$)), needs to be added back. However, the example power module 102 is not provided an indication of the output voltage $V_{OUT}$; rather, the power module 102 merely receives the PWM signals and acts accordingly. Moreover, the example power module 102 is not provided an indication of the value of the inductance of the inductor 104. Stated differently, there are no dedicated pins or terminals of the power module 102 that receive an indication of the setpoint for the output voltage $V_{OUT}$ or an indication of the value of the inductance of the inductor 104. However, the slope of the signal indicative of instantaneous current is proportional the ratio of ($V_{OUT}/L$), and thus in example case the controller 304 uses the value indicative of slope accordingly.

Still referring to the upper half of FIG. 6. The voltage held on the sample-and-hold capacitor 634 is applied to another transcondcutance amplifier 638 which generates a current representative of the error (hereafter the error current). The error current is integrated by the capacitor 640 coupled across the inputs of yet another transconductance amplifier 642. The transconductance amplifier 642 produces three current signals, where each current has a magnitude proportional to the slope of the signal indicative of instantaneous current. The left-most current source draws current from the capacitor 624 to make the circuit a closed-loop circuit for stability reasons.

The right-most current source, designated $I_{SLOPE}$ in the figure, generates a current that is summed with the voltage held on the capacitor 608 in the lower half of the figure. Conceptually, the signal produced by the amplifier 600 (i.e., the signal indicative of voltage drop across the low-side FET 302) is summed, at certain times, with the $I_{SLOPE}$ current to at least partially address the small error introduced by the blanking time. Stated otherwise, the $I_{SLOPE}$ current, representative of the second portion of the Equation (3), is added to at least partially correct the small error in the determination of the value indicative of average current caused by the blanking time.

Inasmuch as the value indicative of average current is created during each discharge mode in non-transient operation, the $I_{SLOPE}$ current is added during periods of time when the average is being determined. Stated otherwise, the $I_{SLOPE}$ current is added during each discharge mode so as affect the value indicative of average current, and the value indicative of average current is driven during the next charge mode as the signal indicative of average current. Thus, in example cases, the switch 644, which enables and disables the $I_{SLOPE}$ current, is closed or conductive during discharge modes. Thus, in the example circuit the control input of the switch 644 is coupled the $T_{OFF}$ signal.

The discussion now turns to transient operation. Transient operation may be detected by the duration $T_{OFF}$ of the discharge mode being shorter than the duration of the blanking time $T_{BLANK}$. Stated otherwise, if the example system is still within the blanking period when the next charge mode begins, then the system is in transient operation. FIG. 6 shows an example circuit to test for the transient operation. In particular, the example controller 304 includes a D-type flip-flop 646. The clock input of the flip-flop 646 is clocked with the $T_{ON}$ signal. The D input is coupled to the $T_{BLANK}$ signal. Thus, if the $T_{BLANK}$ signal is still asserted when the next charge mode begins, the Q output of the flip-flop 646 is asserted, latching in an indication of the transient operation.

As discussed with respect to FIG. 5, when in transient operation, rather than drive the signal indicative of average current, the example system drives a ramp signal designed to closely emulate the actual ramping current. The slope of the current during a charge mode is given by the following formula:

$$M_{CHARGE} = (V_{IN} - V_{OUT})/L \qquad (4)$$

where $M_{CHARGE}$ is slope of the current during the charge mode, $V_{IN}$ is the input voltage, and the remaining variables are as defined above. As before, however, the example power module 102 is not provided an indication of the input voltage $V_{IN}$ or the output voltage $V_{OUT}$. Moreover, the example power module 102 is not provided an indication of the value of the inductance of the inductor 104. Stated differently, there are no dedicated pins or terminals of the power module 102 that receive an indication of the input voltage $V_{IN}$, the setpoint for the output voltage $V_{OUT}$, or an indication of the value of the inductance of the inductor 104. It turns out, however, that input voltage $V_{IN}$ can be approximated based on the duty cycle of the PWM signal. And as noted above, the ratio of $V_{OUT}/L$ can be approximated based on the slope of the current in a discharge mode. Thus, it can be mathematically shown that a good approximation of the slope of current signal during charges modes may be given by:

$$M_{APPROX} = (V_{OUT}/L)(1/\text{DUTY}) \qquad (5)$$

where $M_{APPROX}$ is an approximated slope of the current during the charge mode, DUTY is the duty cycle of the PWM signal (expressed as a value between zero and one), and the remaining variables are as described above.

Still referring to FIG. 6, and in particular the right side of the upper half. The third current produced by the transconductance amplifier 642 (i.e., the middle source in the figure) feeds a circuit that generates a ramp signal based following Equation (5). That is, the middle current source of the transconductance amplifier 642 produces a current whose magnitude is proportional to $V_{OUT}/L$, as discussed above. That current is provided to a set of electrically-controlled switches (hereafter just switches 648 and 650) arranged to implement the (1/DUTY) portion of Equation (5) above. The control input of switch 648 selectively couples the middle current source to an RC circuit of resistor 652 and capacitor 654. The control input of the switch 648 is coupled to the logical NOT of the PWM signal (i.e., the $T_{ON}$ signal). The control input of switch 650 is coupled to the $T_{ON}$ signal. Thus, during $T_{OFF}$ times, the switch 648 is closed or conductive, and the current is enabled to flow the RC circuit. During $T_{ON}$ times, switch 648 is open or non-conductive, and the switch 650 is closed or conductive, draining current from the capacitor 654. The result of the circuit is that the capacitor 654 holds a voltage that is proportional $M_{APPROX}$ of Equation (5) above. The capacitor 654 is coupled across the inputs of transconductance amplifier 656, which produces a current having a magnitude proportional $M_{APPROX}$ of Equation (5) above. The current produced by the transconductance amplifier 656 may be selectively applied to the capacitor 608 by way of electrically-controlled switch (hereafter just switch 658).

In charge modes during transient operation, when the Q output of the flip-flop 646 is asserted, switch 658 is closed or conductive. The current having a magnitude proportional to $M_{APPROX}$ is applied to the capacitor 608, producing an upward ramping signal at the output of the amplifier 614. In order to apply the upward ramping signal to the transconductance amplifier 610, a bypass electrically-controlled switch (hereafter just bypass switch 660) bypasses the resistor 618 and couples the upward ramping signal to the capacitor 620 and switch 622. The control input of the bypass switch 660 is thus coupled to the Q output of the flip-flop 646 (as shown by the bubble "B"). It follows that the upward ramping signal is applied to the transconductance amplifier 610, and the transconductance amplifier 610 produces the emulated signal in the form of the ramp signal (e.g., ramp signal 506 of FIG. 5) having a slope proportional to an absolute value of a slope of the signal indicative of instantaneous current in the last discharge mode. When the transient operation ends, the capacitor 620 holds the peak value achieved, which is then provided to the transconductance amplifier 610 (see, e.g., the portion 510 of FIG. 5 decaying away from the peak value achieved).

Figure 7:
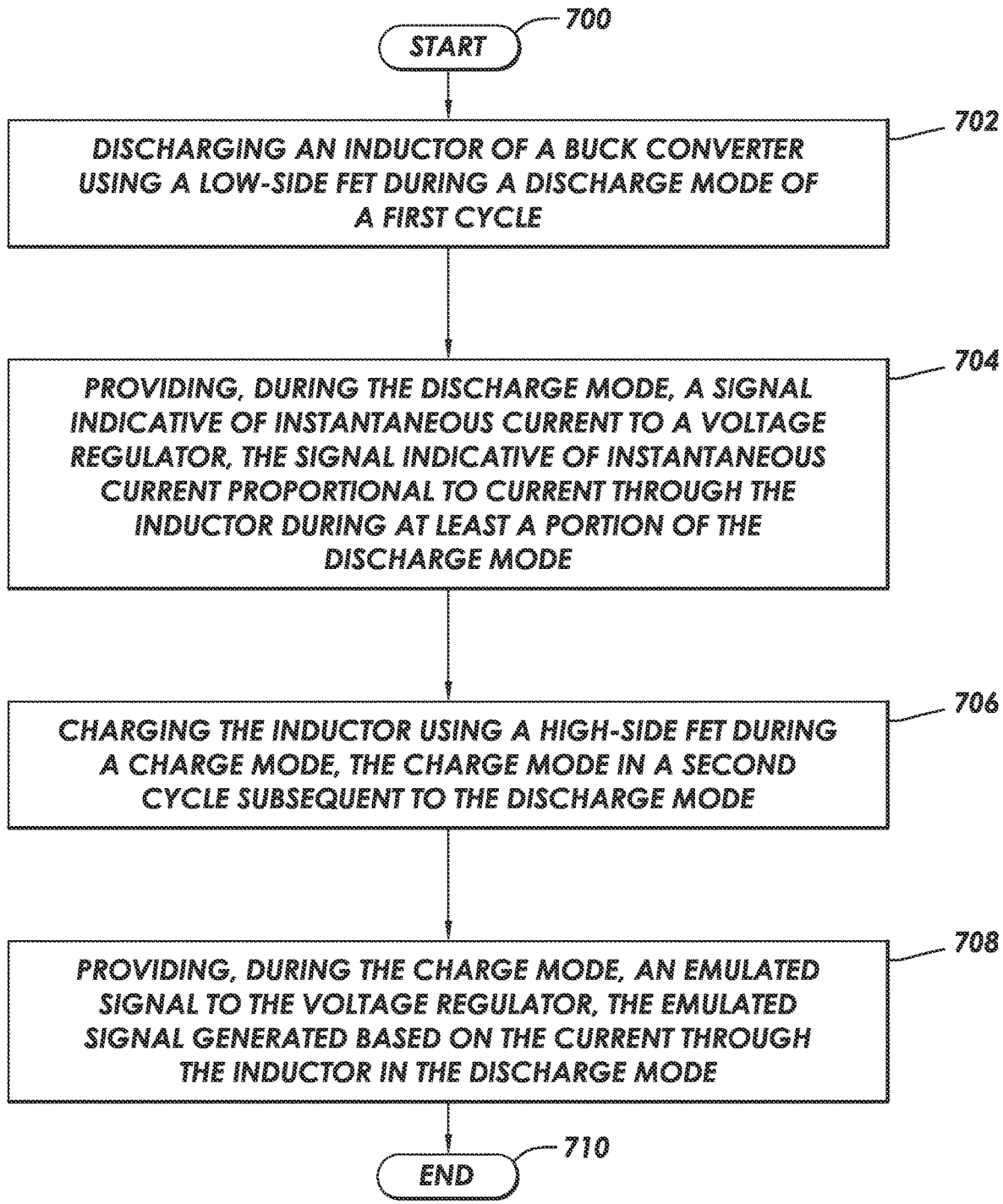
FIG. 7 shows a method in accordance with at least some embodiments.

FIG. 7 shows a method in accordance with at least some embodiments. In particular, the method starts (block 700) and comprises: discharging an inductor of a buck converter using a low-side FET during a discharge mode of a first cycle (block 702); providing, during the discharge mode, a signal indicative of instantaneous current to a voltage regulator, the signal indicative of instantaneous current proportional to current through the inductor during at least a portion of the discharge mode (block 704); charging the inductor using a high-side FET during a charge mode, the charge mode in a second cycle subsequent to the discharge mode (block 706); and providing, during the charge mode, an emulated signal to the voltage regulator, the emulated signal generated based on the current through the inductor in the discharge mode (block 708). Thereafter the method ends (block 710).

Many of the electrical connections in the drawings are shown as direct couplings having no intervening devices, but not expressly stated as such in the description above. Nevertheless, this paragraph shall serve as antecedent basis in the claims for referencing any electrical connection as "directly coupled" for electrical connections shown in the drawing with no intervening device(s).

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method of operating a switching power converter, the method comprising:
   discharging an inductor of a buck converter using a low-side FET during a discharge mode of a first cycle;
   providing, during the discharge mode, a signal indicative of instantaneous current to a voltage regulator, the signal indicative of instantaneous current proportional to current through the inductor during at least a portion of the discharge mode;
   charging the inductor using a high-side FET during a charge mode, the charge mode in a second cycle subsequent to the discharge mode; and
   providing, during the charge mode, an emulated signal to the voltage regulator, the emulated signal generated based on the current through the inductor in the discharge mode,
   wherein providing the emulated signal further comprises:
   sensing that the discharge mode has a duration shorting than a blanking time for measuring a voltage drop across the low-side FET; and responsive to the discharge mode having the duration shorter than the blanking time, and
   providing a ramp signal to the voltage regulator, the ramp signal having a slope proportional to an absolute value of a slope of the signal indicative of instantaneous current in the discharge mode.

2. The method of claim 1:
   wherein providing the signal indicative of instantaneous current to the voltage regulator further comprising driving the signal indicative of instantaneous current to a first terminal of a power module; and
   wherein providing the emulated signal further comprising driving the emulated signal to the first terminal of the power module.

3. The method of claim 1 wherein providing the emulated signal further comprises:
   sensing that the buck converter is in a non-transient operation; and
   providing, during the charge mode of the second cycle, a signal indicative of average current to the voltage regulator, the signal indicative of average current having a magnitude proportional to an average current through the inductor during at least a portion of the first cycle.

4. The method of claim 3:
   wherein providing the signal indicative of instantaneous current during the discharge mode further comprises sensing the voltage drop across the low-side FET, and driving the signal indicative of instantaneous current proportional to the voltage drop across the low-side FET; and wherein providing the signal indicative of average current further comprises:
generating, during the first cycle, the signal indicative of average current through the inductor during the discharge mode; and
driving, during the charge mode of the second cycle, the signal indicative of average current.

5. The method of claim 3 wherein sensing that the buck converter is in the non-transient operation further comprises sensing that the discharge mode has the duration longer than the blanking time for measuring the voltage drop across the low-side FET.

6. The method of claim 1 wherein providing the emulated signal further comprises:
sensing that the buck converter is in transient operation.

7. The method of claim 6 wherein sensing that the buck converter is in the transient operation further comprises sensing that the discharge mode has the duration shorter than the blanking time for measuring the voltage drop across the low-side FET.

8. A power module comprising:
a switch-node terminal, a PWM-input terminal, and a monitor-output terminal;
a high-side FET defining a drain, a source coupled to the switch-node terminal, and a gate;
a low-side FET defining drain coupled to the switch-node terminal, a source, and a gate; and
a controller coupled to the gate of the high-side FET, the gate of the low-side FET, the PWM-input terminal, and the monitor-output terminal, the controller configured to:
responsive to de-assertion of the PWM-input terminal, make the high-side FET non-conductive and the low-side FET conductive to define a discharge mode in a first cycle;
drive, during the discharge mode, a signal indicative of instantaneous current to the monitor-output terminal, the signal indicative of instantaneous current directly proportional to voltage drop across the low-side FET during at least a portion of the discharge mode;
responsive to assertion of the PWM-input terminal, make the low-side FET non-conductive and the high-side FET conductive to define a charge mode in a second cycle subsequent to the first cycle; and
drive, during the charge mode of the second cycle, an emulated signal to the monitor-output terminal, the emulated signal generated based on the current through the low-side FET in the first cycle,
wherein when the controller drives the emulated signal to the monitor-output terminal, the controller is further configured to:
sense a non-transient operation; and
drive, during the charge mode of the second cycle, a signal indicative of average current to the monitor-output terminal, the signal indicative of average current having a magnitude proportional to an average current through the low-side FET during at least a portion of the first cycle.

9. The power module of claim 8 wherein when the controller drives the signal indicative of average current to the monitor-output terminal, the controller is further configured to:
generate, during the first cycle, an intermediate signal indicative of average current through low-side FET during the discharge mode; and
drive, during the charge mode of the second cycle, the signal indicative of average current based on the intermediate signal indicative of average current.

10. The power module of claim 8 wherein when the controller senses the non-transient operation, the controller is further configured to sense that the discharge mode has a duration longer than a blanking time for measuring a voltage drop across the low-side FET.

11. The power module of claim 8 wherein when the controller drives the emulated signal to the monitor-output terminal, the controller is further configured to:
sense a transient operation; and
drive, during the charge mode of the second cycle, a ramp signal to the monitor-output terminal, the ramp signal having a slope proportional to an absolute value of a slope of the signal indicative of instantaneous current in the discharge mode.

12. The power module of claim 11 wherein when the controller senses the transient operation, the controller is further configured to sense that the discharge mode has a duration shorter than a blanking time for measuring a voltage drop across the low-side FET.

13. A system comprising:
an inductor defining a first lead and a second lead coupled to a load;
a voltage regulator defining a voltage-monitor input coupled to the second lead, a PWM output, and a current-monitor input; and
a power module defining a switch node coupled to the first lead, a PWM input coupled to the PWM output, and a monitor output coupled to the current-monitor input, the power module comprising:
a high-side FET defining a source coupled to the switch node and a gate;
a low-side FET defining drain coupled to the switch node, and a gate; and
a controller coupled to the gate of the high-side FET, the gate of the low-side FET, the PWM input, and the current-monitor input of the voltage regulator, the controller configured to:
responsive to de-assertion of the PWM input, make the high-side FET non-conductive and the low-side FET conductive to discharge the inductor during a discharge mode of a first cycle;
drive, during the discharge mode, a signal indicative of instantaneous current to the current-monitor input, the signal indicative of instantaneous current proportional to an instantaneous current through the inductor during at least a portion of the discharge mode;
responsive to assertion of the PWM input, make the low-side FET non-conductive and the high-side FET conductive to charge the inductor during a charge mode of a second cycle subsequent to the first cycle; and
drive, during the charge mode of the second cycle, an emulated signal to the current-monitor input, the emulated signal generated based on a current through the inductor in the first cycle,
wherein when the controller drives the emulated signal to the current-monitor input, the controller is further configured to:
sense a transient operation of the system; and drive, during the charge mode of the second cycle, a ramp signal to the current-monitor input, the ramp signal having a slope proportional to an absolute value of a slope of the signal indicative of instantaneous current in the discharge mode of the first cycle.

14. The system of claim 13 wherein when the controller drives the emulated signal to the current-monitor input, the controller is further configured to:

sense a non-transient operation of the system; and drive, during the charge mode of the second cycle, a signal indicative of average current to the current-monitor input, the signal indicative of average current having a magnitude proportional to an average current through the inductor during at least a portion of the first cycle.

15. The system of claim 14:

wherein when the controller drives the signal indicative of instantaneous current to the current-monitor input, the controller is further configured to sense a voltage drop across the low-side FET, and drive the signal indicative of instantaneous current proportional to the voltage drop across the low-side FET; and wherein when the controller drives the signal indicative of average current to the current-monitor input, the controller is further configured to:

generate an intermediate signal indicative of average current through the inductor during the discharge mode of the first cycle; and drive, during the charge mode of the second cycle, the signal indicative of average current based on the intermediate signal indicative of average current.

16. The system of claim 14 wherein when the controller senses the non-transient operation, the controller is further configured to sense that the discharge mode has a duration longer than a blanking time for measuring voltage drop across the low-side FET.

17. The system of claim 13 wherein when the controller senses the transient operation, the controller is further configured to sense that the discharge mode has a duration shorter than a blanking time for measuring voltage drop across the low-side FET.

* * * * *